(12) United States Patent
Wirtz (10) Patent No.: US 11,970,233 B1
(45) Date of Patent: Apr. 30, 2024

(54) BICYCLE FORK MOUNTING DEVICE

(71) Applicant: Brian S Wirtz, Goleta, CA (US)

(72) Inventor: Brian S Wirtz, Goleta, CA (US)

( * ) Notice: Subject to any disclaimer, the term of this patent is extended or adjusted under 35 U.S.C. 154(b) by 0 days.

(21) Appl. No.: 18/212,663

(22) Filed: Jun. 21, 2023

(51) Int. Cl.
*B62H 3/10* (2006.01)

(52) U.S. Cl.
CPC ..................... *B62H 3/10* (2013.01)

(58) Field of Classification Search
CPC .. B60R 9/09; B60R 9/048; B62H 1/00; B62H 3/00; B62H 3/04; B62H 3/10; B62H 5/148; B62H 2700/00
See application file for complete search history.

(56) References Cited

U.S. PATENT DOCUMENTS

| | | | |
|---|---|---|---|
| 3,828,993 A | 8/1974 | Carter | |
| 4,964,287 A * | 10/1990 | Gaul | B62K 25/02 301/124.2 |
| 5,265,897 A | 11/1993 | Stephens | |
| 5,362,173 A * | 11/1994 | Ng | B62H 3/00 403/324 |
| 5,598,959 A * | 2/1997 | Lorensen | B60R 9/045 224/924 |
| 6,036,069 A | 3/2000 | Sayegh | |
| 6,062,450 A | 5/2000 | Noel | |
| 6,758,380 B1 * | 7/2004 | Kolda | B60R 9/048 224/924 |
| 6,938,782 B2 * | 9/2005 | Dean | B60R 9/048 211/20 |
| 7,326,151 B2 | 2/2008 | Peterson | |
| 7,757,914 B2 * | 7/2010 | Book | B60R 9/048 224/924 |
| 8,196,789 B2 | 6/2012 | Kraeuter | |
| 8,613,380 B2 | 12/2013 | Book | |
| 9,216,699 B2 * | 12/2015 | Flaherty | B60R 9/10 |
| 9,271,584 B1 * | 3/2016 | Weinstein | A47F 5/135 |
| 9,457,630 B2 | 10/2016 | Anderson | |
| 9,598,023 B2 | 3/2017 | Kisaka | |
| 10,023,253 B2 | 7/2018 | McGriskin | |
| 10,300,865 B2 * | 5/2019 | D'Angelo | B60R 9/048 |
| 10,857,949 B2 * | 12/2020 | Lesley | B60R 9/10 |
| 10,926,711 B2 * | 2/2021 | Tsai | B60R 9/10 |
| 11,312,313 B2 | 4/2022 | Puldy | |
| 2006/0054573 A1 | 3/2006 | Dean | |

(Continued)

*Primary Examiner* — Patrick D Hawn
(74) *Attorney, Agent, or Firm* — QuickPatents; Kevin Prince (57) ABSTRACT

The present invention relates to a device for mounting a bicycle to a surface, such as a truck bed or cement slab, or the like. The device includes at least one base configured for mounting with the surface, and a locking mechanism comprising a hollow enclosure with opposing slots, a biasing mechanism, and opposing locking prongs with finger tabs. The locking prongs are confined to slidable movement along a longitudinal axis of the hollow enclosure and extend outwardly from the hollow enclosure in a first locked position. When the finger tabs are squeezed together to retract the locking prongs into the hollow enclosure, the aperture or slot of the bicycle forks are aligned with the locking tabs. When the finger tabs are released, he biasing mechanism forces the locking prongs to extend outwardly to engage the slots or apertures of the bicycle forks to lock the bicycle with the surface.

8 Claims, 6 Drawing Sheets

(56) References Cited

U.S. PATENT DOCUMENTS

| | | | |
|---|---|---|---|
| 2006/0255082 A1* | 11/2006 | Tsai | ................. B60R 11/00 224/567 |
| 2007/0012738 A1* | 1/2007 | Grim | ................. B60R 9/048 224/924 |
| 2008/0061198 A1 | 3/2008 | Noyes | |
| 2009/0274406 A1* | 11/2009 | Spahr | ................. B60B 35/004 384/545 |
| 2011/0278912 A1* | 11/2011 | Schlanger | ............ B60B 27/026 301/124.2 |
| 2013/0062379 A1 | 3/2013 | Sautter | |
| 2015/0011364 A1 | 1/2015 | Kimura | |
| 2015/0151687 A1 | 6/2015 | Tsai | |
| 2016/0131166 A1 | 5/2016 | Cox | |
| 2020/0269768 A1 | 8/2020 | Jarrard | |
| 2021/0252335 A1 | 8/2021 | Brewer | |

\* cited by examiner

BICYCLE FORK MOUNTING DEVICE

CROSS-REFERENCE TO RELATED APPLICATIONS

Not Applicable.

STATEMENT REGARDING FEDERALLY SPONSORED RESEARCH AND DEVELOPMENT

Not Applicable.

FIELD OF THE INVENTION

This invention relates to bicycle mounts, and more particularly to a mount for holding a bicycle to a surface.

BACKGROUND

Bicycles are a popular mode of transportation and recreation, and many people store their bicycles in garages, sheds, or other storage areas. However, storing bicycles can be challenging due to their size and shape. Various devices have been developed to mount bicycles to surfaces, such as walls or ceilings to save space and keep the bicycles secure, and to truck beds or the like for transport.

One approach to mounting bicycles involves using hooks or brackets that attach to the wall or ceiling and hold the bicycle by its frame. However, this approach can be cumbersome and may not work for all types of bicycles, particularly those with unique frame designs or components. Additionally, this approach may not provide a secure enough hold for heavier bicycles or those that are frequently used.

Another approach involves using clamps or brackets that attach to the bicycle's wheels or forks to hold it in place. However, these devices can be difficult to install and may not be compatible with all types of bicycles. Additionally, they may not provide a secure enough hold for heavier bicycles or those that are frequently used.

There is, therefore, a need in the art for an improved device for mounting bicycles to surfaces that is easy to install, compatible with a wide range of bicycle types, and provides a secure and reliable hold. Such a needed device would be relatively inexpensive to manufacture and intuitive to use. The present invention accomplishes these objectives.

SUMMARY OF THE INVENTION

The present device is a device for mounting a bicycle to a surface. The bicycle is of the type having front forks that each have an axle slot or aperture. The device can be configured for working with other vehicles that have similar forks, such as mopeds, motorcycles, scooters, or the like. The surface may be a truck bed, a wall, a ceiling, or any other suitable surface upon which to mount the bicycle for storage or transport.

At least one base has a bottom side, a top side, at least one peripheral edge, and a mounting aperture therethrough. Mechanical fasteners, such as threaded fasteners, can be used to affix the at least one base to the surface. Alternately the at least one base may be welded to the surface, or otherwise affixed to the surface.

A locking mechanism includes a hollow enclosure having a pair of opposing slots formed therethrough. At least one biasing mechanism, such as a coil spring with two opposing ends, a resilient member with two opposing ends, or the like, is fixed between two opposing locking prongs, each that has a laterally-extending finger tab. Each finger tab traverses one of the opposing slots. Each locking prong is confined to slidable movement along a longitudinal axis of the hollow enclosure. In a locked position the locking prongs extend outwardly away from two ends of the hollow enclosure. When the finger tabs are squeezed or pressed together to overcome the biasing mechanism, the locking prongs slidably retract within the hollow enclosure in an unlocked position. A riser is fixed with the top side of the at least one baes and a lower side of the hollow enclosure. In some embodiments the base and the riser are integrally formed.

In use, with the at least one base fixed with the surface, when the finger tabs are squeezed together to retract the locking prongs into the hollow enclosure, the aperture or slot of the bicycle forks are aligned with the locking prongs and the finger tabs are released. The biasing mechanism forces the locking prongs outwardly away from each other and away from the hollow enclosure to engage the slots or apertures of the bicycle forks to lock the bicycle with the surface.

Preferably the hollow enclosure is cylindrical in shape so that a C-shaped locking sleeve can be rotatably fixed with the hollow enclosure. The C-shaped locking sleeve is adapted to rotate between a secured position and a non-secured position. The locking sleeve in the secured position prevents the finger tabs from being pressed together, while the locking sleeve in the non-secured position allows the finger tabs to be pressed together through an open slot of the locking sleeve.

The present invention is an improved device for mounting bicycles to surfaces that is easy to install, compatible with a wide range of bicycle types, and provides a secure and reliable hold. The present device is relatively inexpensive to manufacture and intuitive to use. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
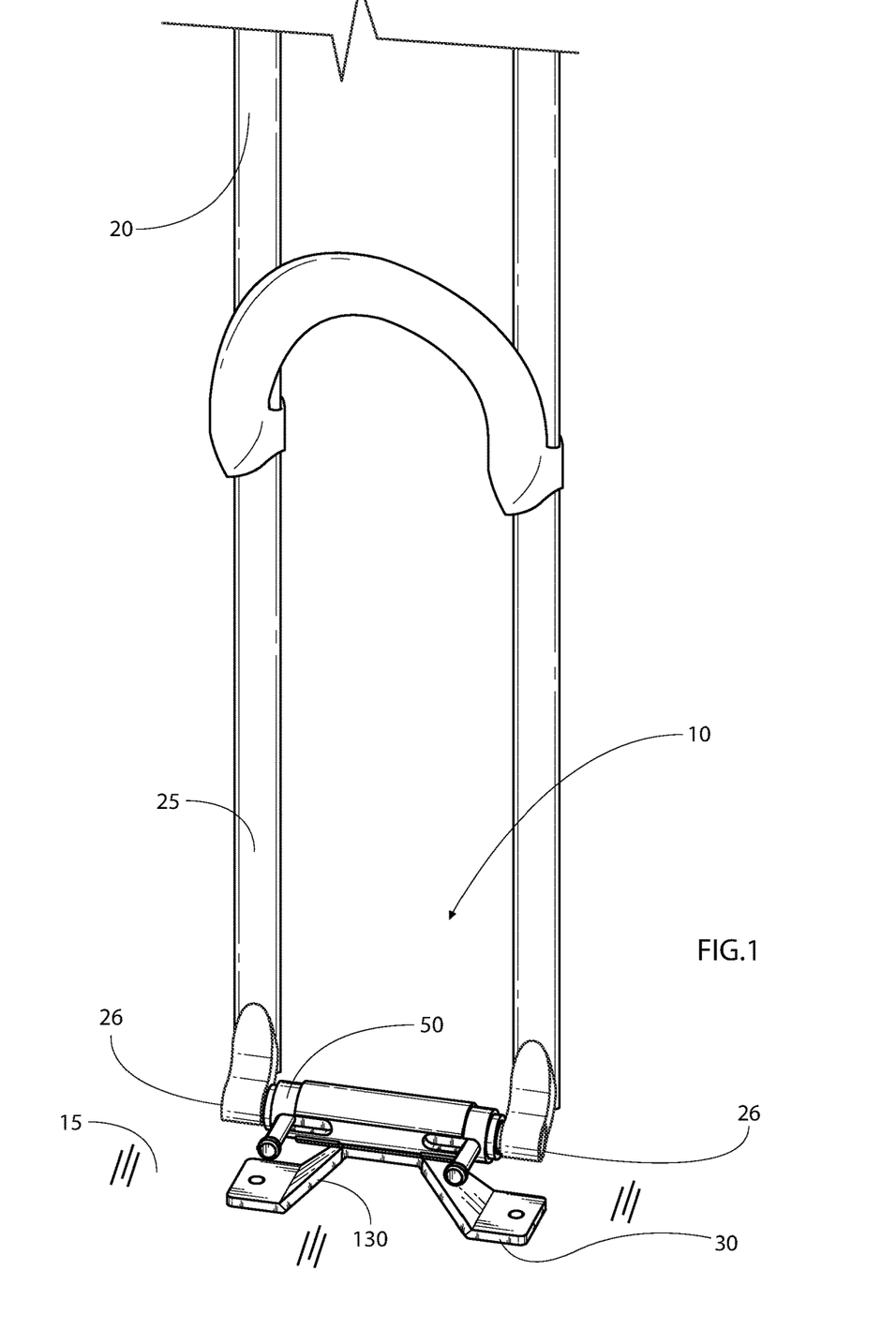
FIG. 1 is a perspective view of the invention, illustrating a bicycle fork mounted to a surface with a device of the present invention.
Figure 2:
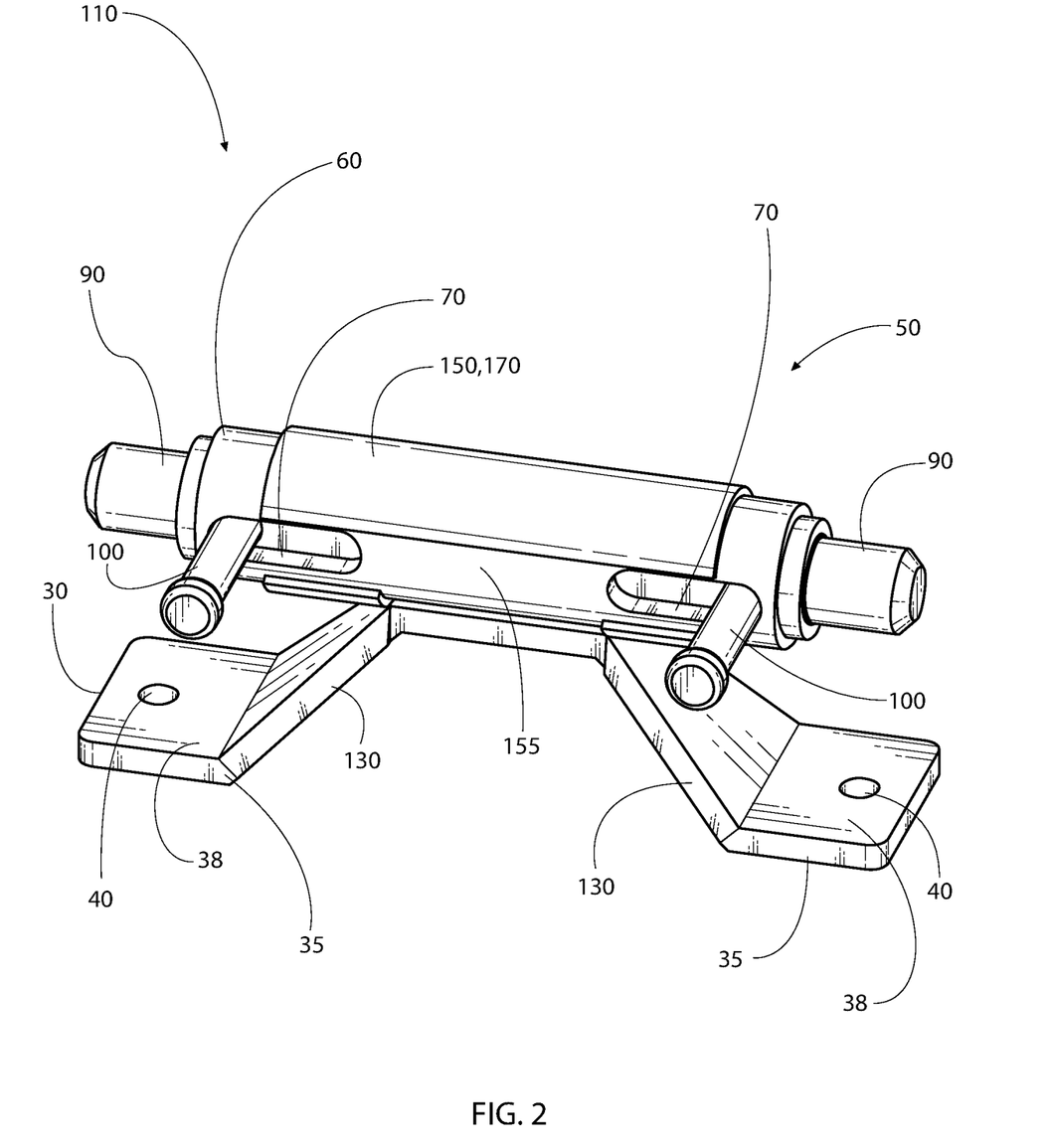
FIG. 2 is an enlarged perspective view of the invention, illustrated in a locked position.
Figure 3:
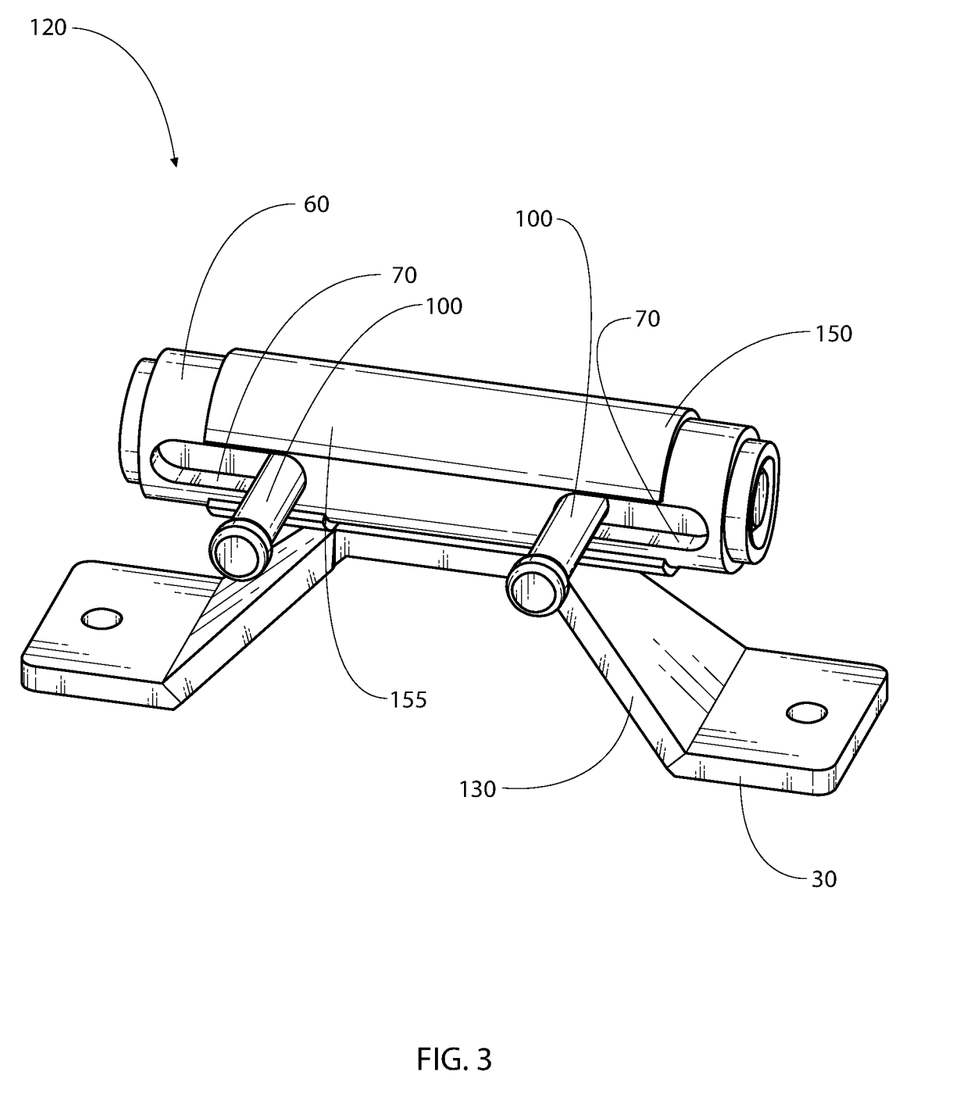
FIG. 3 is an enlarged perspective view of the invention, illustrated in an unlocked position.

FIGS. 1-3 illustrate a device 10 for mounting a bicycle 20 to a surface 15. The bicycle is of the type having front forks 25 that each have an axle slot or aperture 26. The device 10 can be configured for working with other vehicles that have similar forks 25, such as mopeds, motorcycles, scooters, or the like. The surface 15 may be a truck bed, a wall, a ceiling, or any other suitable surface upon which to mount the bicycle 20 for storage or transport.

Figure 4:
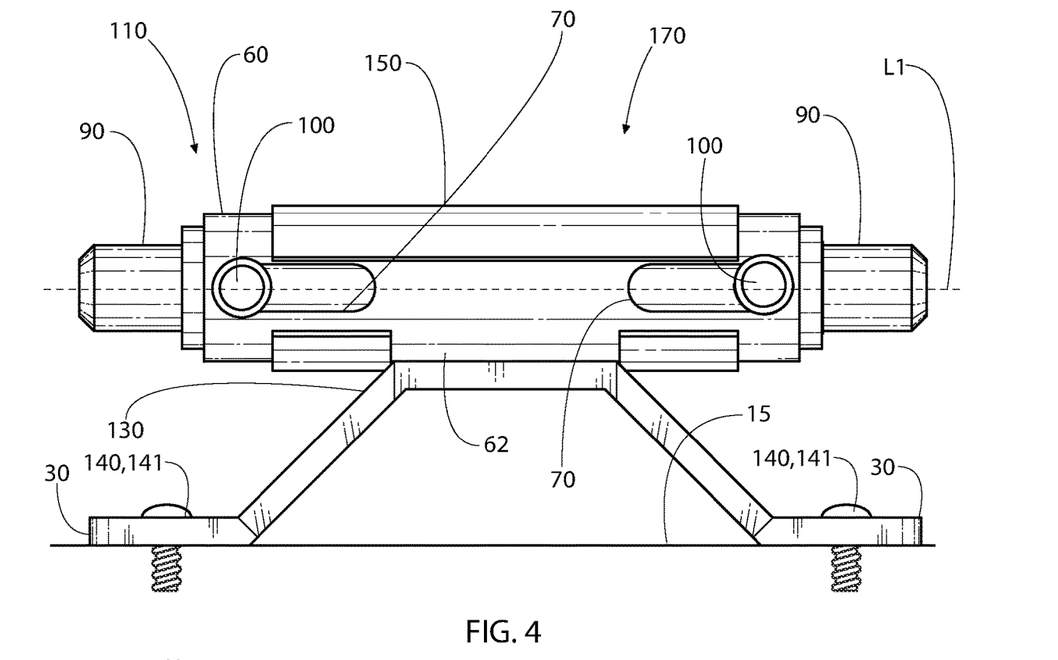
FIG. 4 is a front elevational view of the invention, illustrating a C-shaped locking sleeve in a non-secured position.

At least one base 30 has a bottom side 32, a top side 38, at least one peripheral edge 35, and a mounting aperture 40 therethrough. Mechanical fasteners 140 (FIG. 4), such as threaded fasteners 141, can be used to mount the at least one base 30 to the surface 15. Alternately the at least one base 30 may be welded to the surface 15, or otherwise affixed to the surface 15.

A locking mechanism 50 includes a hollow enclosure 60 having a pair of opposing slots 70 formed therethrough. At least one biasing mechanism 80, such as a coil spring 81 with two opposing ends 82, a resilient member 85 with two opposing ends 86, or the like, is fixed between two opposing locking prongs 90, each that has a laterally-extending finger tab 100. Each finger tab 100 traverses one of the opposing slots 70. Each locking prong 90 is confined to slidable movement along a longitudinal axis L1 of the hollow enclosure 60. In a locked position 110 the locking prongs 90 extend outwardly away from ends 65 of the hollow enclosure 60.

When the finger tabs 100 are squeezed or pressed together to overcome the biasing mechanism 80, the locking prongs 90 slidably retract within the hollow enclosure 60 (FIG. 3) in an unlocked position 120.

A riser 130 is fixed with the top side of the at least one baes 30 and a lower side 62 of the hollow enclosure 60. In some embodiments the base 30 and the riser 130 are integrally formed. In other embodiments, the riser 130 is fixed with either a single base 30 (not shown) or the pair of bases 30.

In use, with the at least one base 30 fixed with the surface 15, when the finger tabs 100 are squeezed together to retract the locking prongs 90 into the hollow enclosure 60, the aperture or slot 26 of the bicycle forks 25 are aligned with the locking prongs 90 and the finger tabs 100 are released.

The biasing mechanism 80 forces the locking prongs 90 outwardly away from each other and away from the hollow enclosure 60 to engage the slots or apertures 26 of the bicycle forks 25 to lock the bicycle 20 with the surface 15.

Figure 5:
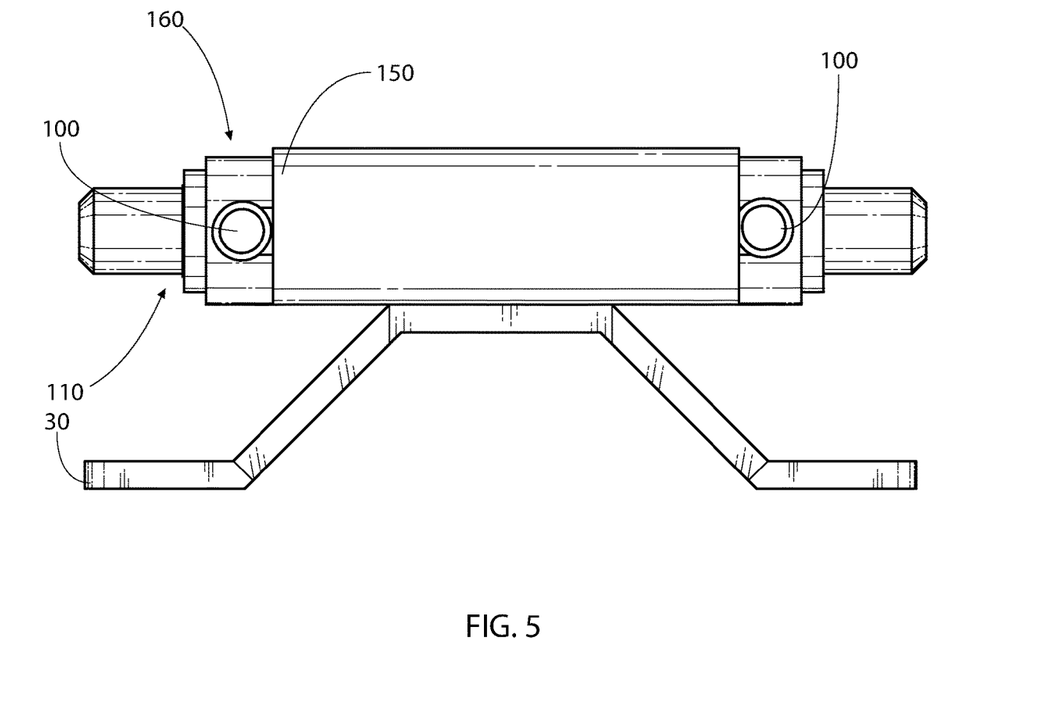
FIG. 5 is a front elevational view of the invention, illustrating the C-shaped locking sleeve in a secured position.
Figure 6A:
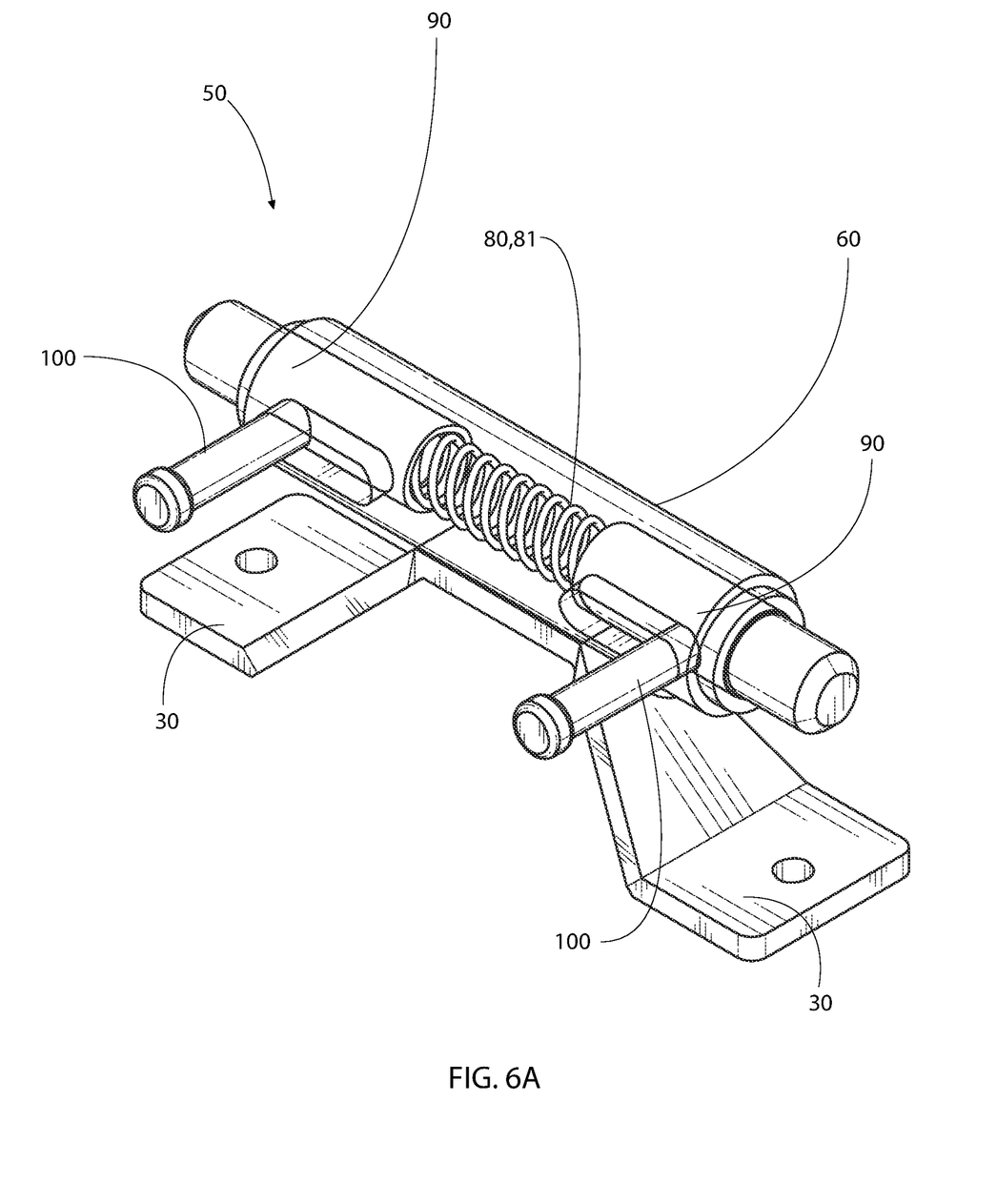
FIG. 6A is a perspective view of the device with a hollow enclosure shown as transparent to reveal a biasing mechanism in the form of a coil spring.
Figure 6B:
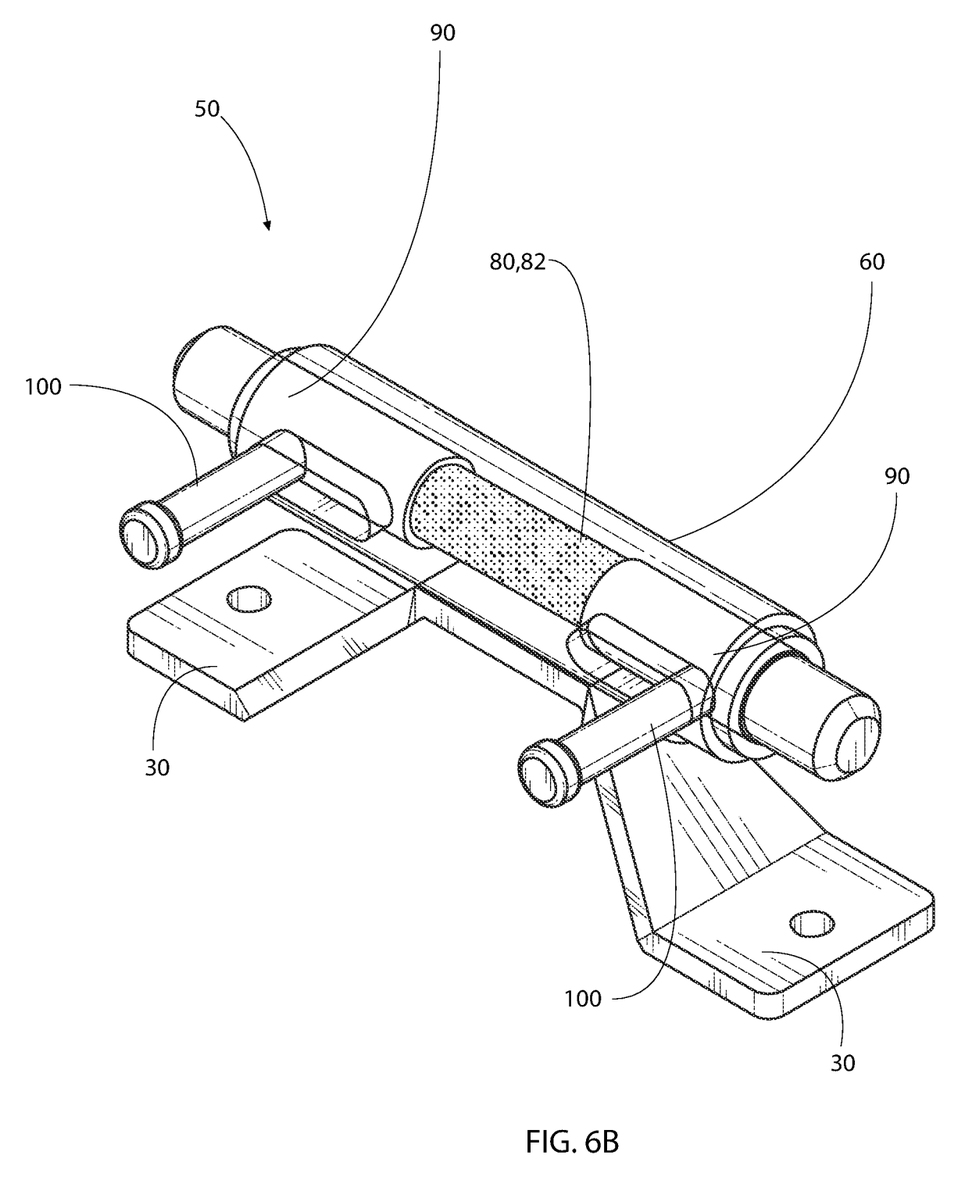
FIG. 6B is a perspective view of the device as shown in FIG. 6A but with the biasing mechanism in the form of a resilient member.

Preferably the hollow enclosure 60 is cylindrical in shape so that a C-shaped locking sleeve 150 can be rotatably fixed with the hollow enclosure 60. The C-shaped locking sleeve is adapted to rotate between a secured position 160 (FIG. 4) and a non-secured position 170 (FIG. 5). The locking sleeve 150 in the secured position 160 prevents the finger tabs 100 from being pressed together, while the locking sleeve 150 in the non-secured position 170 allows the finger tabs 100 to be pressed together through an open slot 155 of the locking sleeve 150.

While a particular form of the invention has been illustrated and described, it will be apparent that various modifications can be made without departing from the spirit and scope of the invention. For example, the base, the riser, and the hollow enclosure may all be integrally formed. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A device for mounting a bicycle to a surface, the bicycle of the type having front forks each having an axle slot or aperture, the device comprising:
   at least one base having a bottom side, a top side, and at least one peripheral edge, the at least one base having at least one mounting aperture therethrough;
   a locking mechanism comprising a hollow enclosure having a pair of opposing slots formed therethrough, at least one biasing mechanism, a pair of opposing locking prongs, each locking prong having a laterally-extending finger tab, each finger tab traversing one of the opposing slots, each locking prong confined to slidable movement along a longitudinal axis of the hollow enclosure, and in a first locked position the locking prongs extending outwardly away from ends of the hollow enclosure, and when the finger tabs are squeezed together to overcome the biasing mechanism, the locking prongs slidably retracting within the hollow enclosure in an unlocked position; and
   a riser fixed with a top side of the at least one base and a lower side of the hollow enclosure;
   whereby with the at least one base fixed with the surface, when the finger tabs are squeezed together to retract the locking prongs into the hollow enclosure, the aperture or slot of the bicycle forks are aligned with the locking prongs and the finger tabs are released, the biasing mechanism forcing the locking prongs to extend outwardly from the hollow enclosure to engage the slots or apertures of the bicycle forks to lock the bicycle with the surface.

2. The device of claim 1 wherein the at least one base includes two bases, each having one of the mounting apertures, each base being secured to the surface with a mechanical fasteners.

3. The device of claim 2 wherein each mechanical fasteners is a threaded fastener.

4. The device of claim 1 wherein the at least one biasing mechanism is a single spring having two opposing ends, each end pressing against one of the opposing locking prongs.

5. The device of claim 1 wherein the at least one biasing mechanism is a single resilient foam member having two opposing ends, each end pressing against one of the opposing locking prongs.

6. The device of claim 1 wherein each base and the riser are integrally formed.

7. The device of claim 1 wherein the hollow enclosure is cylindrical in shape.

8. The device of claim 7 further including a C-shaped locking sleeve rotatably fixed with the hollow enclosure and adapted to rotate between a secured position and non-secured position, the locking sleeve in the secured position preventing the finger tabs from being pressed together, the locking sleeve in the non-secured position allowing the finger tabs to be pressed together through an open slot of the locking sleeve.

* * * * *